(12) United States Patent
Chen et al.

(10) Patent No.: US 12,486,122 B2
(45) Date of Patent: Dec. 2, 2025

(54) METHOD AND SYSTEM FOR AUTOMATICALLY PLACING AN OBJECT INTO A CONTAINER

(71) Applicant: SOLOMON TECHNOLOGY CORPORATION, Taipei (TW)

(72) Inventors: Cheng-Lung Chen, Taipei (TW); Xuan Loc Nguyen, Taipei (TW); Ting Han Liu, Taipei (TW); Yu-Yen Liu, Taipei (TW)

(73) Assignee: SOLOMON TECHNOLOGY CORPORATION, Taipei (TW)

( * ) Notice: Subject to any disclaimer, the term of this patent is extended or adjusted under 35 U.S.C. 154(b) by 984 days.

(21) Appl. No.: 17/645,926

(22) Filed: Dec. 23, 2021

(65) Prior Publication Data

US 2023/0202774 A1   Jun. 29, 2023

(51) Int. Cl.
*B65G 47/90* (2006.01)
*B25J 9/16* (2006.01)
*G06T 7/62* (2017.01)
*G06T 7/70* (2017.01)
(Continued)

(52) U.S. Cl.
CPC .......... *B65G 47/905* (2013.01); *B25J 9/1697* (2013.01); *G06T 7/62* (2017.01); *G06T 7/70* (2017.01); *H04N 13/239* (2018.05); *H04N 13/296* (2018.05); *G06T 2207/10028* (2013.01)

(58) Field of Classification Search
CPC ..... B65G 47/905; B25J 9/1697; B25J 9/1687; G06T 7/62; G06T 7/70; G06T 2207/10028; G06T 7/73; H04N 13/239; H04N 13/296; H04N 13/271; B65B 35/58; B65B 5/105; B65B 57/14; B65B 59/001; B65B 59/02; G05B 2219/40006
See application file for complete search history.

(56) References Cited

U.S. PATENT DOCUMENTS 9,102,429 B2 * 8/2015 Corradi ................ B65B 57/14
10,247,541 B2 * 4/2019 Ni ........................ G01B 11/022
10,867,275 B1   12/2020 Dholakia et al.
(Continued)

FOREIGN PATENT DOCUMENTS

EP   3 200 036 B1   9/2020
TW   201537140 A   10/2015
WO   2020018468 A1   1/2020

OTHER PUBLICATIONS

Search Report appended to an Office Action, which was issued to Taiwanese counterpart application No. 109127544 by the TIPO on May 6, 2021, with an English translation thereof.
(Continued)

*Primary Examiner* — Michael Collins
(74) *Attorney, Agent, or Firm* — HSML P.C.

(57) ABSTRACT

A method for automatically placing a to-be-packed object into a container that defines an accommodation space is provided. A processing unit obtains an object dimension data piece that indicates dimensions of the to-be-packed object, and obtains, through a camera unit that captures images of the to-be-packed object and the accommodation space, an unoccupied area related to the accommodation space. Based on the object dimension data piece and the unoccupied area, the processing unit determines whether the container is capable of accommodating the to-be-packed object.

12 Claims, 6 Drawing Sheets

(51) Int. Cl.
    *H04N 13/239*    (2018.01)
    *H04N 13/296*    (2018.01)

(56) References Cited

U.S. PATENT DOCUMENTS

| | | | |
|---|---|---|---|
| 11,620,591 B2 * | 4/2023 | Capoia | G06Q 10/043 |
| | | | 705/337 |
| 2011/0308204 A1 * | 12/2011 | Corradi | B65B 57/14 |
| | | | 53/115 |
| 2017/0217620 A1 * | 8/2017 | Zeilstra | B65B 43/08 |
| 2020/0017317 A1 * | 1/2020 | Yap | G06Q 10/08 |
| 2021/0129333 A1 | 5/2021 | Kanunikov et al. | |
| 2021/0398308 A1 | 12/2021 | Barish | |
| 2023/0174258 A1 * | 6/2023 | Lian | G06T 7/13 |
| | | | 53/475 |

OTHER PUBLICATIONS

Search Report and Written Opinion issued to Singapore counterpart application No. 10202251285U by the IPOS on Aug. 6, 2025.

* cited by examiner

METHOD AND SYSTEM FOR AUTOMATICALLY PLACING AN OBJECT INTO A CONTAINER

FIELD

The disclosure relates to an automated method for placing an object into a container, and more particularly to an automated method and an automated system that use machine vision to put an object into a container.

BACKGROUND

Recently, modern production lines may use machine vision with automatic control technology to replace human work. For example, three-dimensional (3D) point cloud can be used to achieve real-time recognition of various objects with different appearances. Using the 3D point cloud that is generated by machine vision to automatically pack various objects is one of the applications that can significantly save manpower.

However, with limited hardware computing capability, computing huge amount of data in the 3D point cloud may be time-consuming.

SUMMARY

Therefore, an object of the disclosure is to provide a method that is more efficient in terms of automatically placing a to-be-packed object into a container.

According to the disclosure, the method is provided for automatically placing a to-be-packed object into a container that defines an accommodation space. The method includes steps of: by a processing unit, obtaining an object dimension data piece that is related to dimensions of the to-be-packed object, and controlling a camera unit to capture an image of the accommodation space to obtain a space three-dimensional (3D) point cloud; by the processing unit, obtaining an unoccupied area related to the accommodation space based on the space 3D point cloud; by the processing unit, determining, based on the object dimension data piece and the unoccupied area, whether a first accommodation condition that corresponds to the to-be-packed object is satisfied; and by the processing unit, upon determining that the first accommodation condition is satisfied, controlling a holding unit to place the to-be-packed object into the accommodation space at a position that corresponds to the unoccupied area.

Another object of the disclosure is to provide a system that includes a camera unit, a holding unit, and a processing unit that is electrically connected to the camera unit and the holding unit, and that is configured to perform the method of this disclosure.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

In this disclosure, if not specifically defined, the term "electrical connection" in the description may refer to either a "wired connection" between multiple electronic apparatuses/devices/components that are connected to each other by conductive materials, or a "wireless connection" for uni-/bi-directional wireless signal transmission through wireless communication technology. Moreover, if not specifically defined, the "electrical connection" mentioned in the description may refer to either "direct electrical connection" formed by the direct connection between multiple electronic apparatuses/devices/components or "indirect electrical connection" formed by the indirect connection between multiple electronic apparatuses/devices/components through other electronic apparatuses/devices/components.

Further, in this disclosure, directional terms such as "up", "down", "left", "right", "front", "back", etc. are used only to explain exemplarily the relative positions of multiple hardware components in embodiment(s) of the disclosure in conjunction with the drawings, and are not intended to limit the scope of implementation of the disclosure.

Figure 1:
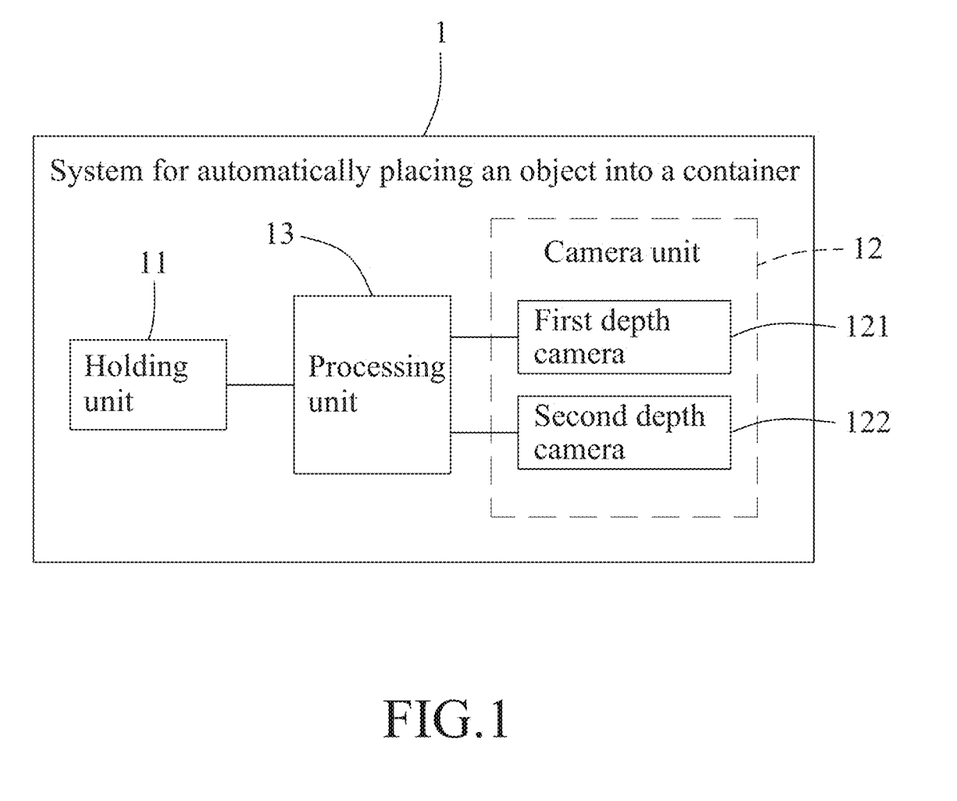
FIG. 1 is a block diagram illustrating an embodiment of a system for automatically placing an object into a container according to the disclosure.
Figure 2:
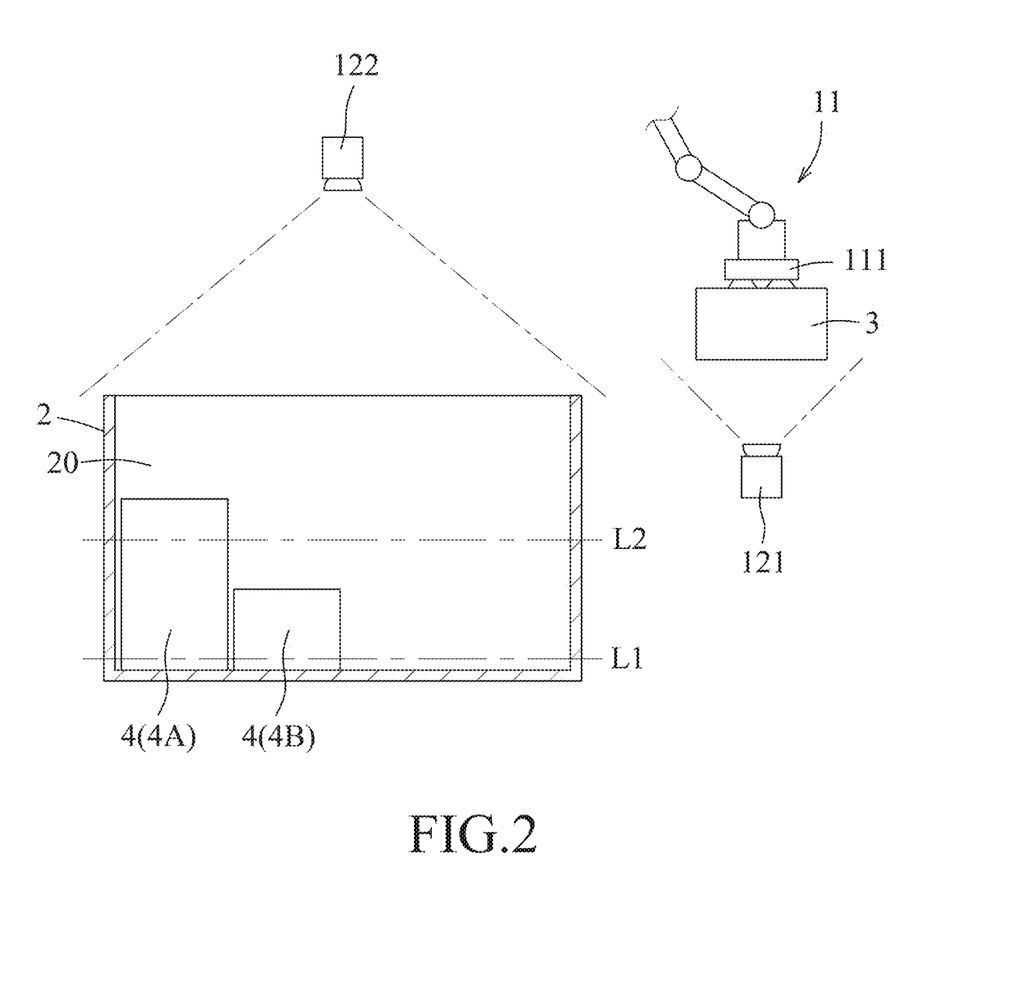
FIG. 2 is a schematic diagram exemplarily illustrating configuration of the system.

Referring to FIGS. 1 and 2, a first embodiment of a system 1 for automatically placing a to-be-packed object 3 into a container 2 is shown. In practice, there may be multiple to-be-packed objects 3 to be placed into the container 2, and the system 1 may put the to-be-packed objects 3 into the container 2 one by one. Hereinafter, operation of the system. 1 is described with respect to one to-be-packed object 3 for ease of explanation, but this disclosure is not limited in this respect. The container 2 defines an accommodation space 20 therein, and may be a storage box or a shipping box in this embodiment, but this disclosure is not limited in this respect. The to-be-packed object 3 may be a product to be placed in the container 2 for shipment, but this disclosure is not limited in this respect.

In FIG. 2, it is exemplified that two existing objects 4 (denoted as 4A and 4B, respectively) are already placed in the accommodation space 20. In other embodiments, there may be zero, one, or more than two existing objects 4 already placed in the accommodation space 20 prior to putting the to-be-packed object 3 into the container 2, and this disclosure is not limited in this respect.

Referring to FIG. 1, the system 1 of this embodiment includes a holding unit 11, a camera unit 12, and a processing unit 13 (e.g., a processor, a microcontroller, etc.) that is electrically connected to the holding unit 11 and the camera unit 12.

The holding unit 11 is operable by the processing unit 13, and may be realized as, for example but not limited to, a robotic arm with one or more vacuum suction cups. As exemplified in FIG. 2, the holding unit 11 may have a holding end 111 to which vacuum suction cups are mounted, so the holding unit 11 can hold and move the to-be-packed object 3 by sucking a top surface of the to-be-packed object 3. In other embodiments, the holding unit 11 may be realized as other types of robotic arms, and this disclosure is not limited in this respect.

In this embodiment, the camera unit 12 may include, for example but not limited to, a first depth camera 121 and a second depth camera 122 that are electrically connected to the processing unit 13, and that are configured to capture images using, for example but not limited to, stereo vision, structured light, time of flight, etc., and this disclosure is not limited in this respect. As exemplified in FIG. 2, in this embodiment, the first depth camera 121 is disposed to face upward (capture images from below), and the second depth camera 122 is disposed to face downward (capture images from above).

Figure 3:
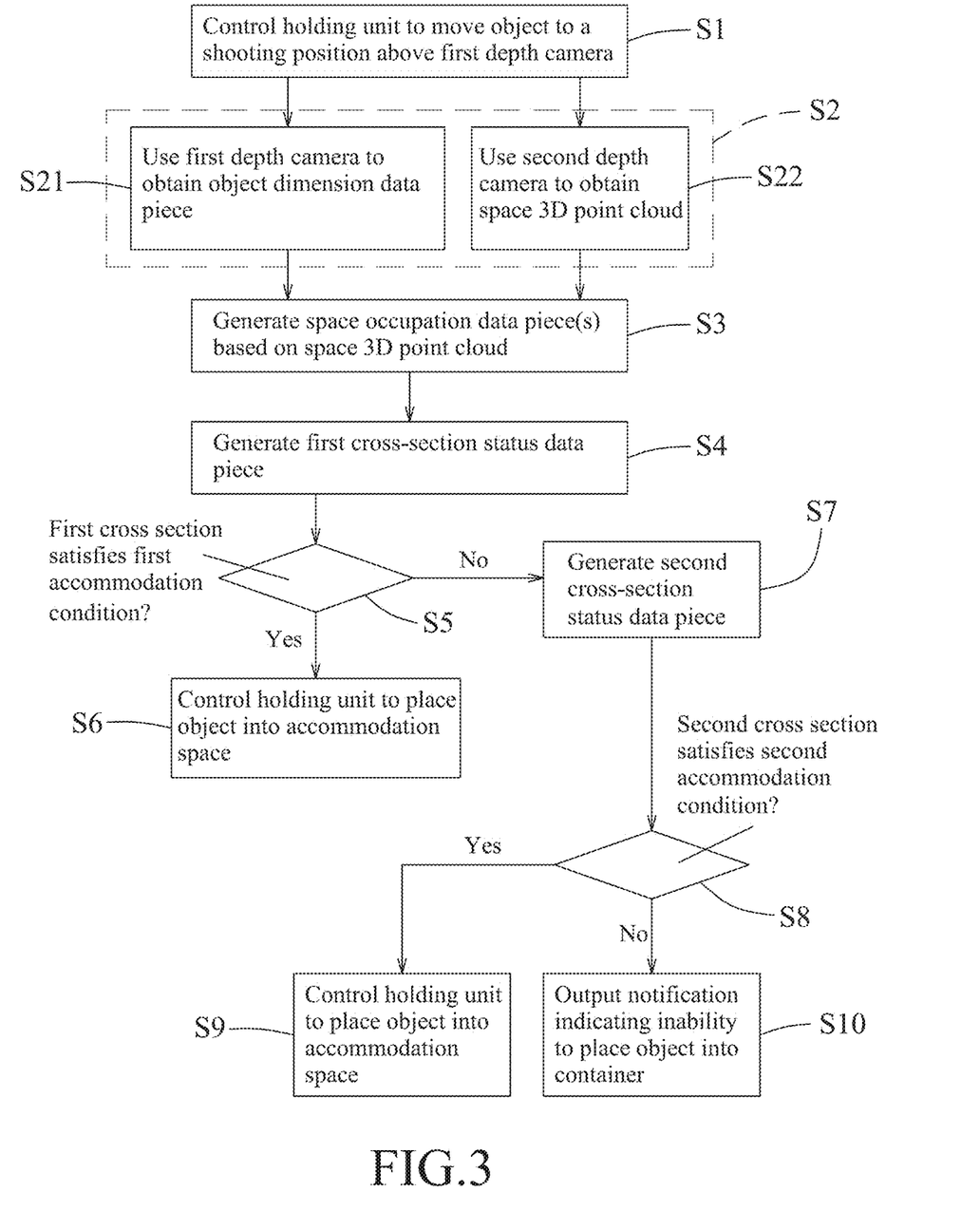
FIG. 3 is a flow chart illustrating steps of a first embodiment of a method for automatically placing an object into a container according to the disclosure.

Referring to FIGS. 1 to 3, an exemplary operation flow of the system 1 for automatically placing the to-be-packed object 3 into the container 2 described hereinafter.

Before the flow enters step S1, it is assumed that the to-be-packed object 3 has been placed in a waiting area that is accessible by the holding unit 11, and that the container 2 has been sent by an automated conveying device (e.g., an automatic guided vehicle, a conveyor belt, etc.) to be below the second depth camera 122 with an opening thereof facing upwardly, so the container the accommodation space 20 and the existing objects 4A, 4B are within a shooting range of the second depth camera 122.

In step S1, the processing unit 13 controls the holding unit 11 to move the holding end 111 to the waiting area, to pick up the to-be-packed object 3, and to move the to-be-packed object 3 from the waiting area to a shooting position above the first depth camera 121, so the to-be-packed object 3 is within a shooting range of the first depth area 121, as shown in FIG. 2. The flow then goes to step S2.

In this embodiment, step S2 includes sub-steps S21 and S22 that are not necessarily performed in a specific order. In some embodiments, sub-steps S21 and S22 may be performed simultaneously.

In sub-step S21, the processing unit 13 obtains an object dimension data piece that is related to dimensions of the to-be-packed object 3. In this embodiment, the processing unit 13 controls the first depth camera 121 to capture an image of the to-be-packed object 3, so as to obtain an object three-dimensional (3D) point cloud generated by the first depth camera 121. Then, the processing unit 13 generates the object dimension data piece based on the to-be-packed object 3 that is presented by the object 3D point cloud.

In this embodiment, since the first depth camera 121 is disposed to capture the image of the to-be-packed object 3 from below the to-be-packed object 3, the object 3D point cloud presents the to-be-packed object 3 that is held by the holding unit 11 in an upward view. The object dimension data piece includes a target length and a target width that correspond to the to-be-packed object 3, and the target length and the target width may be determined by the processing unit 13 that analyzes the to-be-packed object 3 presented by the object 3D point cloud.

In detail, the target length is longer than or equal to a distance between two outermost points of the to-be-packed object 3 in a lengthwise direction (hereinafter termed "lengthwise extent" of the to-be-packed object 3), and the target width is wider than or equal to a distance between two outermost points of the to-be-packed object 3 in a widthwise direction that is perpendicular to the lengthwise direction (hereinafter termed "widthwise extent" of the to-be-packed object). In other words, regardless of the shape of the to-be-packed object 3, the target length and the target width that corresponds to the to-be-packed object cooperatively define a virtual rectangular frame that can surround the to-be-packed object 3 at any height of the to-be-packed object 3. As a result, the object 3D point cloud is simplified into the object dimension data piece that indicates a two-dimensional (2D) virtual rectangular frame, so a computational load for the subsequent steps may be reduced.

In sub-step 322, the processing unit 13 controls the second depth camera 122 to capture an image of the accommodation space 20 to obtain a space 3D point cloud generated by the second depth camera 122. Since the second depth camera 122 is disposed to capture the image of the accommodation space 20 from above the container 2 as shown in FIG. 2, the space 3D point cloud may present the container 2, the accommodation space 20, and any existing object 4 that is placed in the accommodation space 20 (the existing objects 4A, 4B in the case of FIG. 2) in an aerial view, but this disclosure is not limited in this respect.

After the processing unit 13 obtains the object dimension data piece and the space 3D point cloud, the flow goes to step 33.

In step 33, the processing unit 13 generates, for each existing object 4, a space occupation data piece that corresponds to the existing object 4 based on the space 3D point cloud. In this embodiment, since there are two existing objects 4A, 4B placed in the accommodation space 20, the processing unit 13 generates two space occupation data pieces that respectively correspond to the existing objects 4A, 4B.

The space occupation data piece for any existing object 4 indicates an occupied part of the accommodation space 20, which corresponds in position to a position of the corresponding existing object 4 in the accommodation space 20. In detail, the occupied part of the accommodation space 20 as indicated by the space occupation data piece may be a cuboid (inclusive of a cube) that has an occupation length greater than or equal to a distance between two outermost points of the corresponding existing object 4 in the lengthwise direction (hereinafter termed "lengthwise extent" of the existing object 4), an occupation width greater than or equal to a distance between two outermost points of the corresponding existing object 4 in the widthwise direction (hereinafter termed "widthwise extent" of the existing object 4), and an occupation height greater than or equal to a distance between two outermost points of the corresponding existing object 4 in a heightwise direction perpendicular to the lengthwise direction and the widthwise direction (hereinafter termed "heightwise extent" of the existing object 4).

Figure 4:
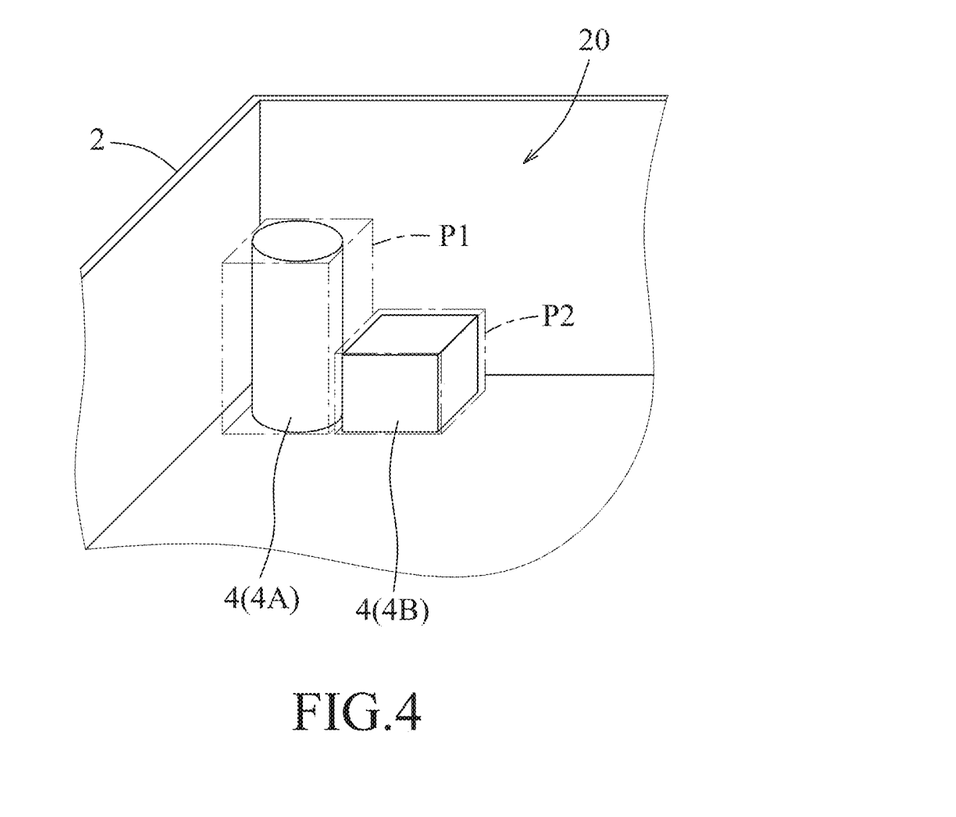
FIG. 4 is a fragmentary perspective view exemplarily illustrating two existing objects in the container.

Further referring to FIG. 4, it is assumed that the existing object 4A is shaped as a cylinder, that the existing object 4B is shaped as a cuboid, and that the existing objects 4A, 4B are placed at a rear left side of the accommodation space 20. The occupied part of the accommodation space 20 as indicated by one of the space occupation data pieces that corresponds to the existing object 4A (referred to as first space occupation data piece) is exemplified as a first occupied part P1 in FIG. 4, and the occupied part of the accommodation space 20 as indicated by the other one of the space occupation data pieces that corresponds to the existing object. 4B (referred to as second space occupation data piece) is exemplified as a second occupied part P2 in FIG. 4.

As exemplified in FIG. 4, the first occupied part P1 corresponds in position to a position of the existing object 4A in the accommodation space 20, and the second occupied part P2 corresponds position to a position of the existing object 4B in the accommodation space 20. As an example, the length, the width and the height of the first occupied part P1 may be respectively greater than the lengthwise extent, the widthwise extent and the heightwise direction of the existing object 4A by 1 mm, but this disclosure is not limited to such. Accordingly, the first occupied part P1 as indicated by the first space occupation data piece is a virtual cuboid that can completely enclose the existing object 4A at the position of the existing object 4A, and the second occupied part P2 as indicated by the second space occupation data piece is another virtual cuboid that can completely enclose the existing object 4B at the position of the existing object 4B. In step S3, even if an existing object 4 has a complex shape or an irregular shape, the corresponding occupied part as indicated by the corresponding space occupation data piece would be shaped as a cuboid, so as to reduce computational load of the processing unit 13 in terms of analyzing an occupied space and a position of the existing object 4 in the accommodation space 20.

It is noted that, in this embodiment, the processing unit 13 may use a neural network technology to identify each existing object 4 from the space 3D point cloud, so a number of the space occupation data piece (s) generated by the processing unit 13 will be equal to a number of the existing object(s) 4. Thus, the number of the space occupation data piece (s) generated by the processing unit 13 is dependent on the number of the existing object (s) 4 in the accommodation space 20, and may be different in other embodiments. If there is no existing object 4 placed in the accommodation space 20, the processing unit 13 will not generate any space occupation data piece in step S3. In this embodiment, the space occupation data piece (s) may be generated using conventional artificial intelligence (AI) technologies, image processing technologies, octotrees, etc., and this disclosure is not limited in this respect.

In step S4, the processing unit 13 generates a first cross-section status data piece based on the space occupation data piece(s) that respectively correspond to the existing object(s) 4. To be specific, the processing unit 13 generates the first cross-section status data piece based on dimensions and positions of the occupied part(s) in the accommodation space 20. The first cross-section status data piece corresponds to a first cross section L1 of the accommodation space 20 that is parallel to a bottom surface of the container 2, and is indicative of an unoccupied area (i.e., an area not occupied by any of the existing object (s) 4) of the first cross section L1. In this embodiment, the first cross section L1 is proximate to the bottom surface of the container 2. In this embodiment, a height of the first cross section L1 from the bottom surface of the container 2 may be a user-defined value that is not greater than a height of a shortest one of the existing object(s) 4, but this disclosure is not limited in this respect. As exemplified in FIGS. 2 and 4, the first cross-section status data piece is used to point out which part or parts of the first cross section. L1 is or are not occupied by the existing objects 4A, 4B. In this embodiment, for example, the first cross-section status data piece may indicate that the first cross section L1 has two occupied areas that are respectively occupied by the existing objects 4A, 4B, and an unoccupied area that is unoccupied by any object.

Figure 5:
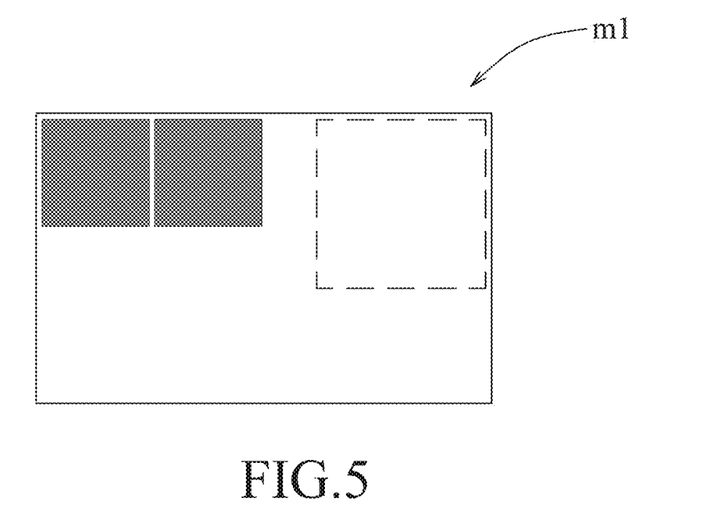
FIG. 5 is a schematic diagram exemplarily illustrating a status of a first cross section of an accommodation space of the container.

Further referring to FIG. 5 where the first cross-section status data piece is visualized as a first plan view m1, the first plan view m1 is a 2D image that shows a space usage of the accommodation space 20 at the height of the first cross section L1 in top view. The two gray blocks at the upper left corner of the first plan view m1 respectively represent the occupied areas that respectively correspond to the existing objects 4A, 4B in the first cross section L1 of the accommodation space 20, and the remaining portion in white color represents the unoccupied area of the first cross section L1. Since the first cross-section status data piece is generated in step S4 using the space occupation data piece(s), compared to directly using the space 3D point cloud to generate the cross-section status data piece, this embodiment can significantly reduce computation load for the processing unit 13 in terms of generating the cross-section status data piece, and time required for generating the cross-section status data piece can thus be significantly reduced as well.

It should be noted that the first plan view m1 shown in FIG. 5 is provided for ease of explaining the content of the first cross-section status data piece. In reality, the first cross-section status data piece may use binary "0" or "1" to represent a status of "occupied" or "unoccupied" for each coordinate point in the first cross section L1. The processing unit 13 does not have to convert the first cross-section status data piece into the first plan view m1 when implementing the method of this disclosure.

In step S5, the processing unit 13 determines whether the first cross section L1 as indicated by the first cross-section status data piece satisfies a first accommodation condition that corresponds to the to-be-packed object 3 based on the object dimension data piece and the unoccupied area of the first cross section L1 as indicated by the first cross-section status data piece. In this embodiment, the first accommodation condition includes that the unoccupied area of the first cross section L1 has a target region of which a length is greater than or equal to the target length, and of which a width is greater than or equal to the target width. In other words, the first accommodation condition requires the unoccupied area of the first cross section L1 to be capable of accommodating the virtual rectangular frame defined by the target length and the target width. The flow goes to step S6 when the processing unit 13 determines that the first cross section L1 as indicated by the first cross-section status data piece satisfies the first accommodation condition, and goes to step S7 when otherwise. It is noted that the first cross-section status data piece can be understood as a 2D image. So one may understand step S5 as the processing unit 13 simplifying the space 3D point cloud into a 2D image, so as to use the 2D image, rather than the entire space 3D point cloud that contains a huge amount of data, in determining whether the remaining, unoccupied space in the container 2 is sufficient for accommodating the to-be-packed object 3. As a result, the computational load of the processing unit 13 is significantly reduced, and time required for the computation is also reduced.

In step S6, the processing unit 13 controls the holding unit 11 to place the to-be-packed object 3 into the accommodation space 20 at a position corresponding to the unoccupied area of the first cross section L1. To be specific, the processing unit 13 controls the holding unit 11 to place the to-be-packed object 3 into the accommodation space 20 at a position corresponding to the target region.

In FIG. 5, the target region is illustrated as a portion that is enclosed by a dashed line at an upper right corner of the first plan view m1. When the unoccupied area of the first cross section L1 is large enough to provide multiple options for the target region, the processing unit 13 may use conventional algorithms such as bin packing to choose a target region with optimal space utilization. For example, the processing unit 13 may choose a target region from a portion of the unoccupied area that is proximate to an edge or a corner of the accommodation space 20. In some embodiments, the processing unit 13 may determine the target region from the unoccupied area of the first cross section L1 along a specific direction. In detail, the processing unit 13 may scan the unoccupied area of the first cross section L1 in the specific direction to determine whether a scanned portion of the unoccupied area of the first cross section L1 satisfies the first accommodation condition. For example, the processing unit 13 may scan the unoccupied area of the first cross section L1 from an upper left corner in a lengthwise direction of the accommodation space 20 to search for the target region; and, after a first to-be-packed object is placed in the target region, the processing unit 13 may, after steps S1 to S5 are performed for the next to-be-packed object, search for a target region in the unoccupied area of the first cross section L1 for the next to-be-packed object from a side of the first to-be-packed object in the lengthwise direction of the accommodation space 20. It is noted that this disclosure does not focus on the algorithm for determining the target region, so details thereof are omitted herein for the sake of brevity.

It is noted that the processing unit 13 may determine a movement path along which the holding unit 11 moves the to-be-packed object 3 and puts the to-be-packed object 3 into the container 2 based on relative positions among the container 2, the existing object(s) 4 and the to-be-packed object 3 which is in the waiting area (which can be acquired from the space 3D point cloud and the object 3D point cloud), relative positions of the holding unit 11 and the to-be-packed object 3, and an orientation of the to-be-packed object 3 (which can be acquired from the object 3D point cloud), but this disclosure is not limited in this respect.

In step S7, the processing unit 13 generates a second cross-section status data piece based on the space 3D point cloud. The second cross-section status data piece corresponds to a second cross section L2 of the accommodation space 20 that is parallel to and disposed above the first cross section L1, and is indicative of an unoccupied area of the second cross section L2.

Figure 6:
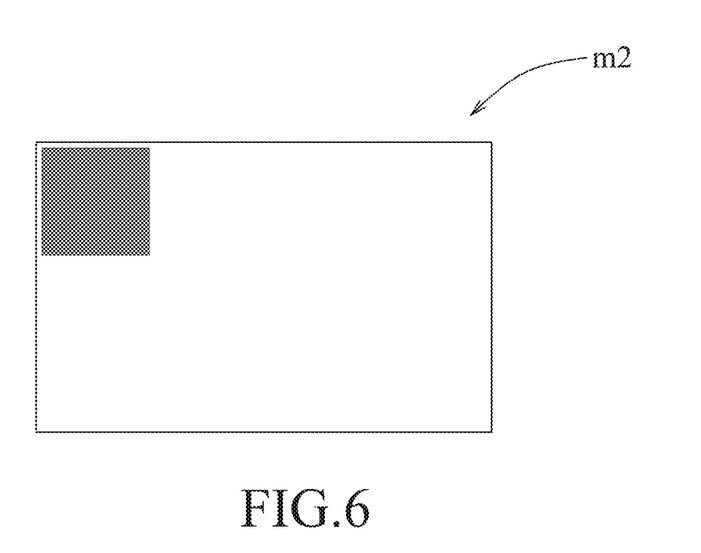
FIG. 6 is a schematic diagram exemplarily illustrating a status of a second cross section of an accommodation space of the container.

Referring to FIG. 2 and the second cross section L2 is spaced apart from and disposed above the first cross section L1. To be specific, the second cross section L2 is not only higher than a top of the existing object 4B, but also higher than a top of the second occupied part P2 that corresponds to the existing object 4B in this embodiment. In FIG. 6, the second cross-section status data piece is visualized as a second plan view m2. Compared to the first plan view m1 in FIG. 5, the second plan view m2 shows that the second cross section L2 has only one occupied area (i.e., the gray block at the upper left corner of the second plan view m2) that S occupied by the existing object 4A, and does not have an occupied area that corresponds to the existing object 4B as shown in the first plan view m1. Accordingly, the unoccupied area of the second cross section L2 as indicated by the second cross-section status data piece is larger than that of the first cross section L1 as indicated by the first cross-section status data piece.

In step S8, the processing unit 13 determines whether the second cross section L2 as indicated by the second cross-section status data piece satisfies a second accommodation condition that corresponds to the to-be-packed object 3 based on the object dimension data piece and the unoccupied area of the second cross section L2 as indicated by the second cross-section status data piece. In the first embodiment, the way the processing unit 13 determines whether the second cross section L2 satisfies the second accommodation condition in step S8 is similar to the way the processing unit 13 determines whether the first cross section L1 satisfies the first accommodation condition in step S5, namely, the second accommodation condition includes that the unoccupied area of the second cross section L2 has a target region, so details thereof are omitted herein for the sake of brevity. The flow goes to step S9 when the processing unit 13 determines that the second cross section L2 as indicated by the second cross-section status data piece satisfies the second accommodation condition, and goes to step S10 when otherwise.

In step S9, which is similar to step S6, the processing unit 13 controls the holding unit 11 to place the to-be-packed object 3 into the accommodation space 20 at a position corresponding to the unoccupied area (or, to be more specific, the target region in the unoccupied area) of the second cross section L2.

In step S10, the processing unit 13 outputs a notification indicating that the to-be-packed object 3 cannot be placed into the container 2. The notification may be made to cause the automated conveying device to move the container 2 away and have another container 2 placed below the second depth camera 122 for carrying out the abovementioned method of placing the to-be-packed object 3 into said another container 2, but this disclosure is not limited in this respect.

In this embodiment, the processing unit 13 determines, starting from a bottom one of the cross sections, whether the cross section satisfies an accommodation condition that corresponds to the cross section, and only when the accommodation condition is not satisfied, the processing unit 13 determines whether the next lowest cross section satisfies an accommodation condition that corresponds to said next lowest cross section. Taking FIG. 2 as an example, upon determining that the first cross section L1 satisfies the first accommodation condition in step S5, the processing unit 13 controls the holding unit 11 to place the to-be-packed object 3 into the container 2 in step S6, so, in such a scenario, the second cross-section status data piece is not required, and steps S7-S10 can be omitted. As a result, when space utilization of the accommodation space 20 is low, the processing unit 13 may place the to-be-packed object 3 into the container 2 after having generated only one cross-section status data piece, so the packing efficiency of the system 1 may be optimized.

It is noted that the aforesaid description for steps S1 to S10 and the flow chart shown in FIG. 3 are just one possible implementation of the method of this disclosure, and the sequence of steps S1 to S10 should not limit the scope of this disclosure.

In this embodiment, heights at which the first cross section L1 and the second cross section L2 are located relative to the accommodation space 20 may be predefined in the system 1. Although this embodiment is exemplarily described with two cross sections the first cross section L1 and the second cross section L2), a different quantity of cross sections may be used in other embodiments, and this disclosure is not limited in this respect. For example, if the container 2 has a greater depth. (i.e., the accommodation space 20 has a greater height), users may define more cross sections that are spaced apart from each other in a height direction of the accommodation space 20, and the processing unit 13 can determine, one by one from bottom to top, whether the cross section (s) satisfies the corresponding accommodation condition(s).

To sum up for the first embodiment, time required by the system 1 of the embodiment would be about 1/100 the time required by a system that has the same hardware performance as the system 1 and that directly compares the object 3D point cloud and the space 3D point cloud in terms of computation for determining whether the accommodation space 20 is capable of receiving the to-be-packed object 3 therein. In addition, the processing unit 13 does not have to be pre-trained to learn an appearance of the to-be-packed object 3, and the system. 1 does not have to pre-store information related to the appearance and the size of the to-be-packed object 3. As a result, the system. 1 of the embodiment can perform automated packing in real time without limitations in terms of the appearance of the to-be-packed object 3.

This disclosure further provides a second embodiment of the method, which differs from the first embodiment in that the second accommodation condition in the second embodiment further includes, in addition to that the unoccupied area of the second cross section L2 has a target region, that a target portion of the first cross section L1, which is a portion that corresponds in position to the target region in the second cross section L2 (e.g., a portion of the first cross section L1 that is directly under the target region in the second cross section L2), has at least a predetermined percentage (for example but not limited to, 80%) belonging to the occupied area of the first cross section L1. In other words, the occupied percentage (occupied by the existing object(s) 4) of the target portion of the first cross section L1 must be greater than or equal to the predetermined percentage to satisfy the second accommodation condition. As a result, the second embodiment can ensure that there is sufficient placement area under the target region in the second cross section L2 for supporting the to-be-packed object 3 thereon, so the to-be-packed object 3 will not tilt or fall for having insufficient support from the placement area after the to-be-packed object 3 is placed into the container 2 in step S9. To sum up for the second embodiment, when the processing unit 13 determines that one of the cross sections that is other than the bottom one of the cross sections has the target region, the processing unit 13 further determines whether an occupied percentage of the target portion of the immediately lower one of the cross sections is greater than or equal to the predetermined percentage, and, only when the determination is affirmative will the processing unit 13 determine that the second accommodation condition is satisfied.

This disclosure further provides a third embodiment of the method, which differs from the first embodiment in that, in the third embodiment, the object dimension data piece further includes a target height that corresponds to the to-be-packed object 3. The target height may be determined by the processing unit 13 based on, for example but not limited to, the to-be-packed object 3 as presented by the object 3D point cloud, and/or a height (from the ground) of a portion of the to-be-packed object 3 in contact with the holding unit 11 when the holding unit 11 holds the to-be-packed object 3 at the shooting position. In more detail, the processing unit 13 may calculate a distance between two outermost points of the to-be-packed object 3 in a heightwise direction ((hereinafter termed "heightwise extent" of the to-be-packed object 3) first, and then determine the target height based on the heightwise extent. In one example, the processing unit 13 may obtain a height of a bottom portion (lowest point) of the to-be-packed object 3 relative to ground (referred to as bottom portion height hereinafter) from the to-be-packed object 3 presented by the object 3D point cloud, and make a height of the contact between the holding unit 11 and the to-be-packed object 3 (e.g., a height of a bottom of the vacuum suction cup of the holding unit 11 relative to ground) that is held at the shooting position serve as a height (from the ground) of a top portion of the to-be-packed object 3 (referred to as top portion height hereinafter). Then, the processing unit 13 subtracts the bottom portion height from the top portion height to obtain the heightwise extent of the to-be-packed object 3. In some embodiments, the target height can be equal to the heightwise extent of the to-be-packed object 3. In some embodiments, the target height can be slightly greater than the heightwise extent by, for example but not limited to, 1 mm. The target length, the target width and the target height of the object dimension data piece cooperatively define a virtual cuboid that is capable of enclosing the to-be-packed object 3. As a result, the first accommodation condition used in step S5 may further include that a distance between the first cross section L1 and a top of the container 2 is greater than or equal to the target height, and the second accommodation condition used in step 37 may further include that a distance between the second cross section L2 and the top of the container 2 is greater than or equal to the target height. By use of the target height, the third embodiment can ensure that the to-be-packed object 3 will not protrude from the opening of the container 2 when placed in the container 2, thereby facilitating subsequent packaging process.

This disclosure further provides a fourth embodiment of the method that is similar to the third embodiment where the object dimensional data piece includes the target height that corresponds to the to-be-packed object 3. The fourth embodiment differs from the third embodiment in that the processing unit 13 acquires a lengthwise extent and a widthwise extent of the to-be-packed object 3 based on the to-be-packed object 3 presented by the object 3D point cloud, obtains information of appearance that corresponds to the to-be-packed object 3 (referred to as object appearance information hereinafter) from an object database based on the lengthwise extent and the widthwise extent of the to-be-packed object 3, and makes an object height (heightwise extent) that is included in the object appearance information serve as the target height. The object database may be stored in a data storage device (e.g., a hard disk drive, a solid state drive, a flash memory module, etc.) that can be a part of the system 1, but this disclosure is not limited in this respect. In the fourth embodiment, the processing unit 13 treats the lengthwise extent and the widthwise extent of the to-be-packed object 3 as a feature of the to-be-packed object 3 that can be used to obtain the target height from the object database. In other implementations of the fourth embodiment, the lengthwise extent and the widthwise extent of the to-be-packed object 3 can be obtained from a 2D image of the to-be-packed object 3 rather than the object 3D point cloud. In other words, the first depth camera 121 may be replaced by an ordinary digital camera that captures 2D images. The fourth embodiment is similar to the third embodiment in that the object dimension data piece includes the target length, the target width and the target height, so the object dimension data piece can define a virtual cuboid capable of enclosing the to-be-packed object 3. As described for the third embodiment, each accommodation condition in the fourth embodiment may also include that a distance between the corresponding cross section and the top of the container 2 is greater than or equal to the target height, so as to ensure that the to-be-packed object 3 will not protrude from the opening of the container 2 when placed in the container 2.

This disclosure further provides a fifth embodiment of the method, where the processing unit 13 generates the cross-section status data piece(s) directly based on the space 3D point cloud. In other words, even if there is one or more existing objects 4 already in the accommodation space 20, the processing unit 13 does not generate space occupation data piece(s) for the existing object(s) 4.

This disclosure further provides a sixth embodiment of the method, where the camera unit 12 includes only one depth camera that is operable by the processing unit 13 to move. For example, the depth camera may be mounted to the holding unit 11 so the processing unit 13 can control the holding unit 11 to move the depth camera. As a result, the sixth embodiment can use only one depth camera to capture images with respect to the to-be-packed object 3 and the accommodation space 20, and thus generate the object 3D point cloud and the space 3D point cloud.

This disclosure further provides a seventh embodiment of the method, which is similar to the sixth embodiment in that the camera unit 12 includes only one depth camera. Furthermore, the system 1 that implements the seventh embodiment further includes a barcode scanner (not shown) that electrically connected to the processing unit 13 and that is mounted to the holding unit 11. In step S1 where the processing unit 13 controls the holding unit 11 to pick up the to-be-packed object 3, the processing unit 13 also controls the barcode scanner to read a barcode on the to-be-packed object 3, so as to obtain an identifier of the to-be-packed object 3 (referred to as object identifier hereinafter). Subsequently, the processing unit 13 may use the object identifier to acquire the object appearance information that indicates the dimensions of the to-be-packed object 3 from an object database, and generate the object dimension data piece based on the object appearance information.

Figure 7:
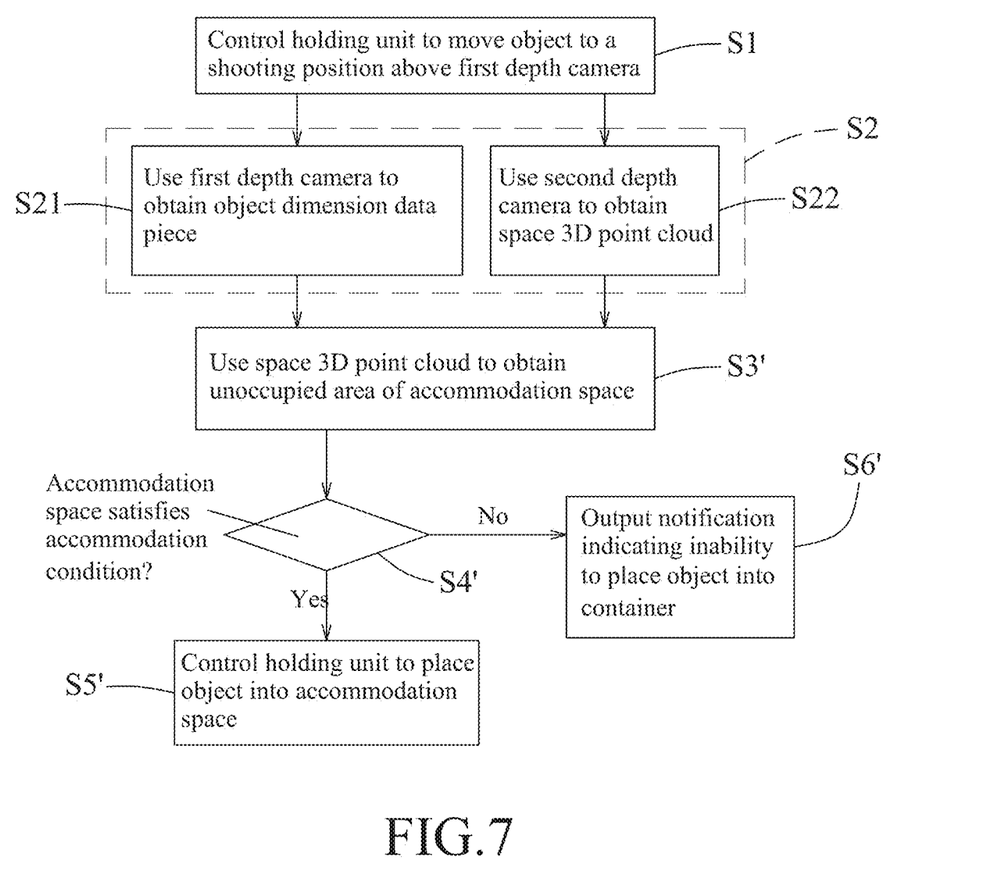
FIG. 7 is a flow chart illustrating steps of an eighth embodiment of method for automatically placing an object into a container according to the disclosure.

Referring to FIGS. 1 and 7, this disclosure further provides an eighth embodiment of the method. The eighth embodiment differs from the first embodiment in that, after step S2, the flow goes to step S3', where the processing unit 13 generates, directly based on the space 3D point cloud, an accommodation space status data piece corresponding to the accommodation space 20 and indicative of an unoccupied area of the accommodation space 20. That is, the processing unit 13 makes, based on the space 3D point cloud, a portion of the accommodation space 20 that is not occupied by the existing object(s) 4 serve as the unoccupied area. In step S4' that follows step S3', the processing unit 13 determines whether the accommodation space 20 satisfies an accommodation condition that corresponds to the to-be-packed object 3 based on the object dimension data piece and the unoccupied area of the accommodation space 20 as indicated by the accommodation space status data piece. The accommodation condition includes that the unoccupied area of the accommodation space 20 has a target region of which a length is greater than or equal to the target length, of which a width is greater than or equal to the target width, and of which a height is greater than or equal to the target height. In some embodiments, the processing unit 13 may make corners of the container 2 and fragmental spaces among multiple existing objects 4 have higher priorities when searching for a target region, and consider a dimensional difference between the to-be-packed object 3 and the existing object(s) 4 in determining the target region. For example, when the unoccupied area of the accommodation space 20 includes a corner of the container 2, the processing unit 13 first determines whether the corner has a target region. When determining that the corner does not have a target region, the processing unit 13 may determine whether the unoccupied area of the accommodation space includes a fragmental space that has a target region. When the unoccupied area of the accommodation space 20 includes multiple fragmental spaces each having a target region, the processing unit 13 selects the smallest one of the fragmental spaces for placing the to-be-packed object 3. In some embodiments, when determining a space for placing the to-be-packed object 3, the processing unit 13 may also consider a difference between a height of the to-be-packed object 3 and a height or heights of the existing object(s) 4 in determining a space for placing the to-be-packed object 3. For example, the space may be determined such that the difference between the height of the to-be-packed object 3 and the height of the tallest one of those of the existing objects 4 that are adjacent to the space is minimum, so as to minimize obstruction on subsequent placements of other to-be-packed objects. When determining that the unoccupied area of the accommodation space 20 does not include a fragmental space that has a target region, the processing unit 3 may follow the steps described for the third embodiment to complete the placement of the to-be-packed object 3 into the container 2. Upon determining that the accommodation space 20 satisfies the accommodation condition in step S4', the flow goes to step S5', where the processing unit 13 controls the holding unit 11 to place the to-be-packed object 3 into the unoccupied area of the accommodation space 20. Otherwise, the flow goes to step S6', where the processing unit 13 outputs a notification indicating that the to-be-packed object 3 cannot be placed into the container 2.

It is noted that, in some variations of the eighth embodiment, the processing unit 13 may follow steps S1 to S4 as described for the first embodiment to generate the cross-section status data piece that corresponds to a cross section of the accommodation space 20, and that is indicative of the unoccupied area of the cross section, and use the unoccupied area of the cross section to perform step S4'.

In the eighth embodiment, by virtue of making the corners of the container 2 and fragmental spaces among multiple existing objects 4 have higher priorities when searching for the target region, the to-be-packed objects may be placed in the container 2 at a greater density, which may reduce shifting or shaking of the to-be-packed objects when the container 2 is being moved.

To sum up, according to some embodiments of this disclosure, the system 1 can generate the cross-section status data piece based on the space 3D point cloud, and determine whether a cross section as indicated by the cross-section status data piece satisfies the corresponding accommodation condition. Since the processing unit 13 uses the cross-section status data piece to determine whether the accommodation space 20 is capable of accommodating the to-be-packed object 3, rather than using the entire space 3D point cloud, the computational load can be significantly reduced, and the computational efficiency can be promoted. In some embodiments, the system I can also directly use the space 3D cloud to obtain the unoccupied area of the accommodation space 20 for determining whether the accommodation condition is satisfied, so as to complete the placement of the to-be-packed object into the container 2.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout specification to "one embodiment," "an embodiment," an embodiment with an indication of an ordinal number and so forth means that particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but s intended to cover various arrangements included within the spirit and scope of the broadest interpretation so as to encompass all such modifications and equivalent arrangements.

What is claimed is:

1. A method for automatically placing a to-be-packed object into a container that defines an accommodation space, comprising steps of:
   by a processing unit, obtaining an object dimension data piece that is related to dimensions of the to-be-packed object, and controlling a camera unit to capture an image of the accommodation space to obtain a space three-dimensional (3D) point cloud;
   by the processing unit, obtaining an unoccupied area related to the accommodation space based on the space 3D point cloud;
   by the processing unit, determining, based on the object dimension data piece and the unoccupied area, whether a first accommodation condition that corresponds to the to-be-packed object is satisfied; and
   by the processing unit, upon determining that the first accommodation condition is satisfied, controlling a holding unit to place the to-be-packed object into the accommodation space at a position that corresponds to the unoccupied area,
   wherein the step of obtaining the unoccupied area includes:
      generating a first cross-section status data piece based on the space 3D point cloud, the first cross-section status data piece corresponding to a first cross section of the accommodation space that is parallel to a bottom surface of the container, and being indicative of an unoccupied area of the first cross section,
   wherein the step of determining whether the first accommodation condition is satisfied includes:
      determining whether the first cross section satisfies the first accommodation condition based on the object dimension data piece and the unoccupied area of the first cross section as indicated by the first cross-section status data piece,
   wherein, upon determining that the first cross section satisfies the first accommodation condition, the processing unit controls the holding unit to place the to-be-packed object into the accommodation space at a position that corresponds to the unoccupied area of the first cross section,
   wherein the step of obtaining an object dimension data piece includes:
      controlling the camera unit to capture an image of the to-be-packed object, so as to obtain an object 3D point cloud; and
      generating the object dimension data piece based on the object 3D point cloud,
   wherein the image of the to-be-packed object is captured by the camera unit from below the to-be-packed object, and the image of the accommodation space is captured by the camera unit from above the container, and
   wherein the camera unit includes a first depth camera disposed to face upwardly, and a second depth camera disposed to face downwardly, and the step of obtaining an object dimension data piece and controlling a camera unit to capture an image of the accommodation space includes:
      controlling the first depth camera to capture the image of the to-be-packed object to obtain the object 3D point cloud; and
      controlling the second depth camera to capture the image of the accommodation space to obtain the space 3D point cloud,
   said method further comprising, before the step of obtaining an object dimension data piece, a step of:
   by the processing unit, controlling the holding unit to move the to-be-packed object to a position above the first depth camera for the first depth camera to capture the image of the to-be-packed object.

2. The method of claim 1, wherein the step of determining whether the first accommodation condition is satisfied includes:
   scanning the unoccupied area of the first cross section in a specific direction to determine whether a scanned portion of the unoccupied area of the first cross section satisfies the first accommodation condition.

3. The method of claim 1, wherein the space 3D point cloud is indicative of the container, the accommodation space, and an existing object that is already placed in the accommodation space, and the step of generating a first cross-section status data piece includes:
   generating, based on the space 3D point cloud, a space occupation data piece that corresponds to the existing object and that indicates an occupied part of the accommodation space, which corresponds in position to a position of the existing object in the accommodation space; and
   generating the first cross-section status data piece based on the space occupation data piece.

4. The method of claim 3, wherein the occupied part of the accommodation space is a space of a cuboid that has a length greater than or equal to a lengthwise extent of the existing object, a width greater than or equal to a widthwise extent of the existing object, and a height greater than or equal to a heightwise extent of the existing object.

5. The method of claim 1, wherein the object dimension data piece includes a target length and a target width that correspond to the to-be-packed object, and the first accommodation condition includes that the unoccupied area of the first cross section has a region of which a length is greater than or equal to the target length, and of which a width is greater than or equal to the target width.

6. The method of claim 5, wherein the object dimension data piece further includes a target height that corresponds to the to-be-packed object, and the first accommodation condition further includes that a distance between the first cross section and a top of the container is greater than or equal to the target height.

7. The method of claim 6, wherein the step of obtaining an object dimension data piece includes:
- determining the target length and the target width based on the image of the to-be-packed object; and
- obtaining the target height from an object database based on a length and a width of the to-be-packed object presented by the image of the to-be-packed object.

8. The method of claim 1, further comprising steps of:
- by the processing unit, upon determining that the first cross section does not satisfy the first accommodation condition, generating a second cross-section status data piece based on the space 3D point cloud, the second cross-section status data piece corresponding to a second cross section of the accommodation space that is parallel to and disposed above the first cross section, and being indicative of an unoccupied area of the second cross section;
- by the processing unit, determining whether the second cross section satisfies a second accommodation condition that corresponds to the to-be-packed object based on the object dimension data piece and the unoccupied area of the second cross section as indicated by the second cross-section status data piece; and
- by the processing unit, upon determining that the second cross section satisfies the second accommodation condition, controlling the holding unit to place the to-be-packed object into the accommodation space at a position corresponding to the unoccupied area of the second cross section.

9. The method of claim 1, wherein the step of determining whether the first accommodation condition is satisfied includes:
- determining whether the unoccupied area includes a corner of the container that satisfies the first accommodation condition.

10. The method of claim 1, wherein the step of determining whether the first accommodation condition is satisfied includes:
- determining whether the unoccupied area includes a fragmental space that is disposed among multiple existing objects in the container, and that satisfies the first accommodation condition.

11. The method of claim 10, wherein the step of determining whether the first accommodation condition is satisfied further includes:
- when the unoccupied area includes a plurality of the fragmental spaces each satisfying the first accommodation condition, selecting a smallest one of the fragmental spaces for placement of the to-be-packet object.

12. A system for automatically placing a to-be-packed object into a container that defines an accommodation space, said system comprising a camera unit, a holding unit, and a processing unit that is electrically connected to said camera unit and said holding unit, and that is configured to perform the method of claim 1.

* * * * *